US008843972B2

(12) United States Patent
Calisa et al.

(10) Patent No.: US 8,843,972 B2
(45) Date of Patent: Sep. 23, 2014

(54) METHOD OF REQUESTING VIDEO DATA DISTRIBUTED ACROSS A PLURALITY OF VIDEO SERVERS

(75) Inventors: Rajanish Calisa, Artarmon (AU); Philip Cox, West Penannt Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 475 days.

(21) Appl. No.: 12/891,103

(22) Filed: Sep. 27, 2010

(65) Prior Publication Data

US 2011/0078751 A1 Mar. 31, 2011

(30) Foreign Application Priority Data

Sep. 29, 2009 (AU) ................................ 2009222481

(51) Int. Cl.
| H04N 7/173 | (2011.01) |
| H04N 21/231 | (2011.01) |
| H04N 21/218 | (2011.01) |
| H04N 21/2312 | (2011.01) |
| H04N 21/24 | (2011.01) |

(52) U.S. Cl.
CPC ..... *H04N 7/17336* (2013.01); *H04N 21/23113* (2013.01); *H04N 21/2181* (2013.01); *H04N 21/2312* (2013.01); *H04N 21/2407* (2013.01)
USPC ................... 725/86; 725/91; 725/92; 725/93; 725/96

(58) Field of Classification Search
None
See application file for complete search history.

(56) References Cited

U.S. PATENT DOCUMENTS

| 7,441,261 | B2* | 10/2008 | Slater et al. ..................... 725/96 |
| 7,659,922 | B2* | 2/2010 | Black et al. ................... 348/143 |
| 8,181,209 | B2* | 5/2012 | Hasek et al. ..................... 725/93 |
| 2003/0002865 | A1* | 1/2003 | Matsui et al. ................. 386/125 |
| 2010/0217837 | A1* | 8/2010 | Ansari et al. .................. 709/218 |

FOREIGN PATENT DOCUMENTS

| JP | 8-335183 A | 12/1996 |
| WO | WO 01/20910 A1 | 3/2001 |
| WO | WO 2007/060536 A2 | 5/2007 |

OTHER PUBLICATIONS

IP Australia of the Australian Government, Notice of Acceptance dated Mar. 14, 2012, in connection with Application No. 2009222481 (2 pages).
Communication from the Australian Government dated Jul. 11, 2011, in connection with Australian Patent Application No. 2009222481.

\* cited by examiner

*Primary Examiner* — Nasser Goodarzi
*Assistant Examiner* — Fred Peng
(74) *Attorney, Agent, or Firm* — Fitzpatrick, Cella, Harper & Scinto

(57) ABSTRACT

A method of requesting video data distributed across a plurality of video servers(210-21N) connected to a communications network (120) is disclosed. A request (e.g., 1000) is transmitted to one of the video servers (e.g., 210). The request (1000) includes at least time information about at least a first portion of the video data. The first portion of video data is received from the video server (210). A redirection message (e.g., 1008) is also received from the video server (210). The redirection message (1008) specifies a next one of the video servers (210) containing a temporally adjacent further portion of the video data.

10 Claims, 13 Drawing Sheets

Original video as captured by camera 1
cover time range 5 Feb 13:00:00.000 to 13:00:00.600

Video frames actually recorded onto server 1
Covering 13:00:00.000 to 13:00:00.300 and 13:00:00.500 to 13:00:00.600

Video frames actually recorded onto server 2
Covering time range 13:00:00.300 to 13:00:00.400

Fig. 5a : File Update Message
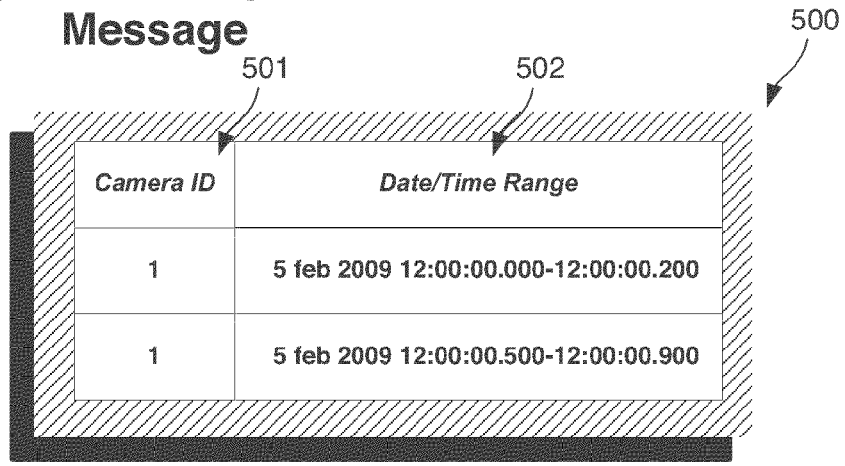
Fig. 5b : LDR Example
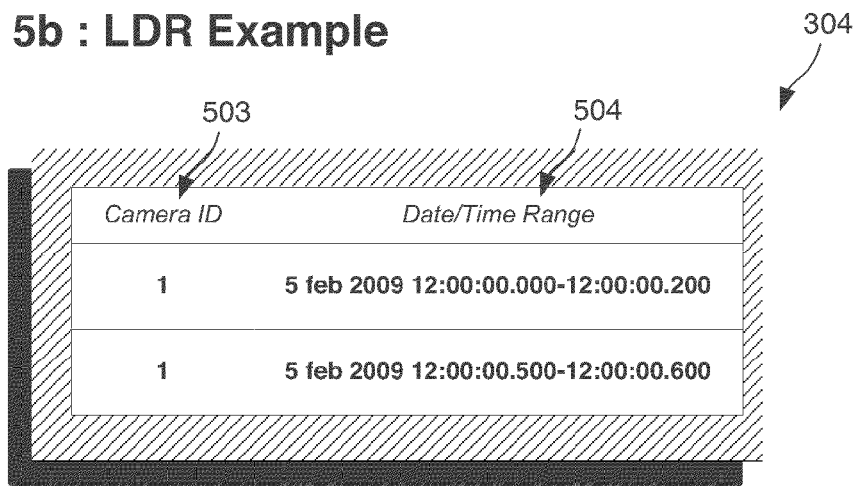
Fig. 5c : NDR Example
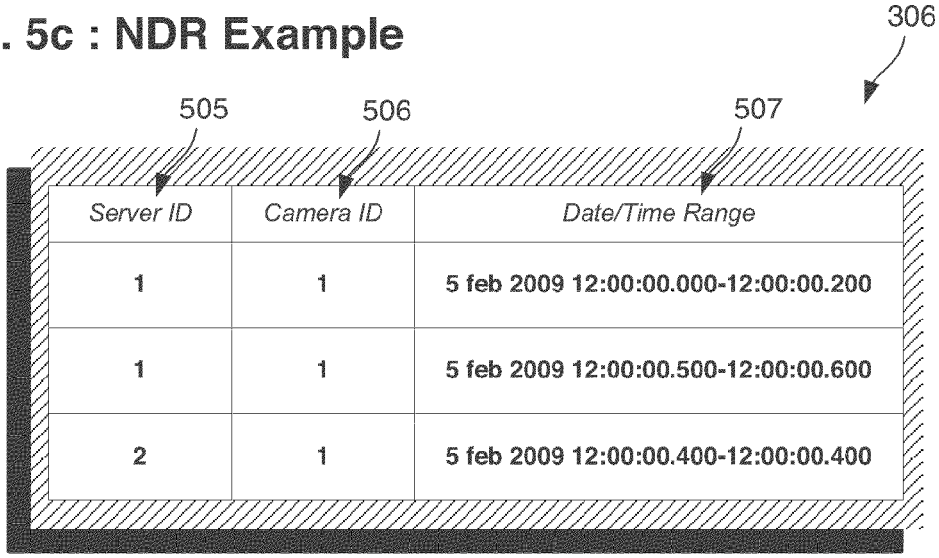

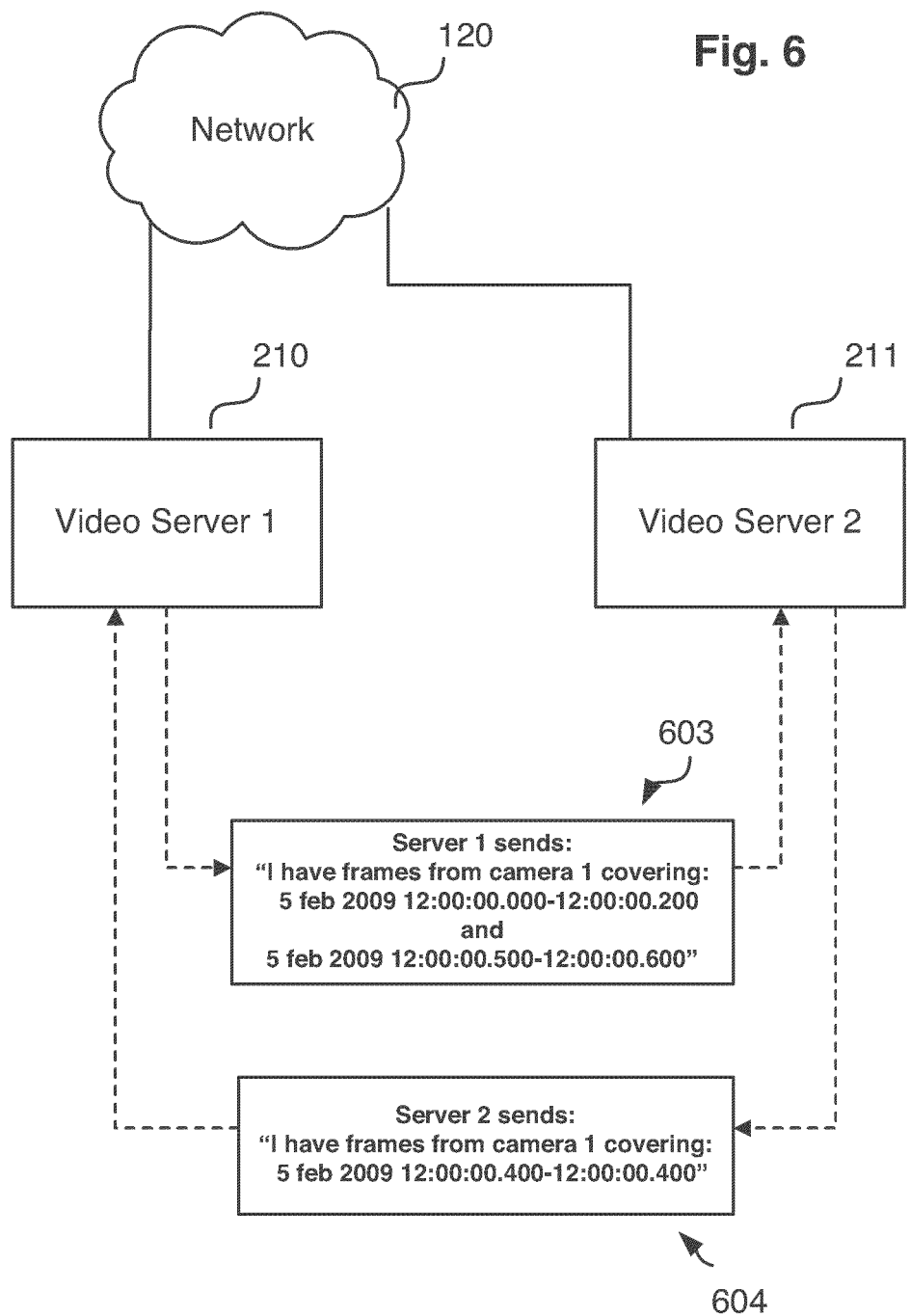

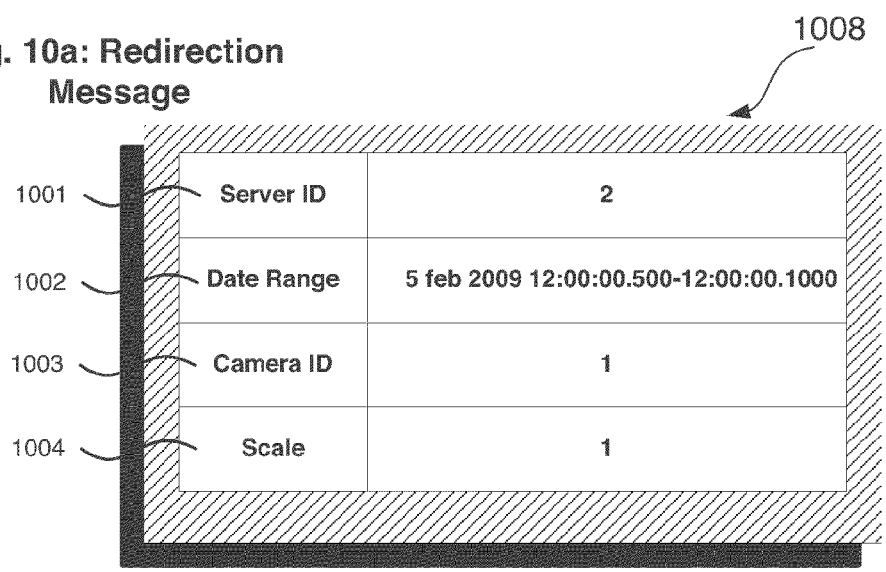
Fig. 10a: Redirection Message
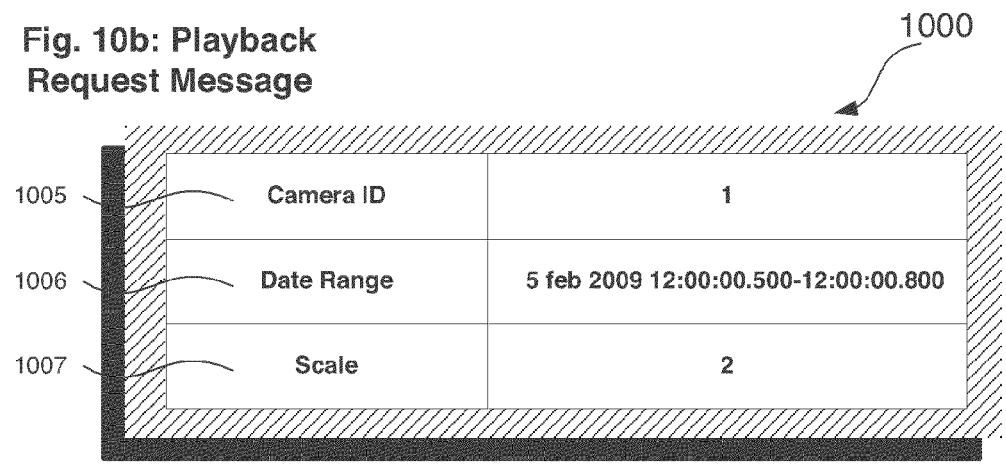
Fig. 10b: Playback Request Message

METHOD OF REQUESTING VIDEO DATA DISTRIBUTED ACROSS A PLURALITY OF VIDEO SERVERS

REFERENCE TO RELATED PATENT APPLICATION

This application claims the benefit under 35 U.S.C. §119 of the filing date of Australian Patent Application No. 2009222481, filed 29 Sep.2009, and is hereby incorporated by reference in its entirety as if fully set forth herein.

FIELD OF INVENTION

The present invention relates to video image processing and, in particular, to a method, apparatus and system for requesting video data distributed across a plurality of video servers. The present invention also relates to a computer program product including a computer readable medium having recorded thereon a computer program for requesting video data distributed across a plurality of video servers.

DESCRIPTION OF BACKGROUND ART

In conventional video systems continuous video data may be stored across a number of discrete video servers. A client connected to the video system often needs to playback the distributed video data from those video servers, in real time. Further, when the playback moves between video servers, the playback should be uninterrupted.

Central indexing based video systems have a dedicated video data server referred to as an 'oracle' server'. The oracle server maintains knowledge of locations and details of all video data stored on the servers of the system, in order to allow a client to seamlessly playback the video data distributed across those video servers. Clients use the oracle server to establish a necessary sequence of video servers that will feed the video data back to the client. The oracle server is complex and expensive to maintain. Such central indexing video data systems are also relatively unreliable as the oracle server is a single point of failure for the system.

Peer-to-peer video data systems rely on video servers having knowledge of data stored on other servers in order to playback distributed video data. Alternatively, some peer-to-peer video data systems have a search mechanism whereby the video server can pass client requests on to other video servers of the system. In such peer-to-peer video systems, establishing a necessary sequence of video servers for playback often involve lengthy delays, which causes breaks in real time playback of video stored on the system. The search mechanism within peer-to-peer video data systems often does not find a required server at all if the server is too many hops away from the client.

SUMMARY OF THE INVENTION

It is an object of the present invention to substantially overcome, or at least ameliorate, one or more disadvantages of existing arrangements.

According to one aspect of the present invention there is provided a method of requesting video data distributed across a plurality of video servers connected to a communications network, said method comprising:

transmitting a request to one of the video servers, the request including at least time information about at least a first portion of the video data;

receiving the first portion of video data from the video server; and receiving a redirection message from the video server, the redirection message specifying a next one of the video servers containing a temporally adjacent further portion of the video data.

According to another aspect of the present invention there is provided an apparatus for requesting video data distributed across a plurality of video servers connected to a communications network, said apparatus comprising:

transmitting means for transmitting a request to one of the video servers, the request including at least time information about at least a first portion of the video data;

video data receiving means for receiving the first portion of video data from the video server; and message receiving means receiving a redirection message from the video server, the redirection message specifying a next one of the video servers containing a temporally adjacent further portion of the video data.

According to still another aspect of the present invention there is provided a computer readable medium having recorded thereon a computer program for requesting video data distributed across a plurality of video servers connected to a communications network, said program comprising:

code for transmitting a request to one of the video servers, the request including at least time information about at least a first portion of the video data;

code for receiving the first portion of video data from the video server; and code for receiving a redirection message from the video server, the redirection message specifying a next one of the video servers containing a temporally adjacent further portion of the video data.

According to still another aspect of the present invention there is provided a system for requesting video data distributed across a plurality of video servers connected to a communications network, said system comprising:

a memory for storing data and a computer program; and a processor coupled to said memory executing said computer program, said computer program comprising instructions for:
  transmitting a request to one of the video servers, the request including at least time information about at least a first portion of the video data;
  receiving the first portion of video data from the video server; and
  receiving a redirection message from the video server, the redirection message specifying a next one of the video servers containing a temporally adjacent further portion of the video data.

Other aspects of the invention are also disclosed.

BRIEF DESCRIPTION OF THE DRAWINGS

One or more embodiments of the invention will now be described with reference to the following drawings, in which:

FIG. 5a shows an example of a file update message;

FIG. 5b shows an example of a local data record (LDR);

FIG. 5c shows an example of a network data record (NDR);

FIG. 6 shows an example of the video servers broadcasting their available data to other video servers in the system of FIG. 2;

FIG. 10a shows an example of a redirection message sent from a video server to the client of FIG. 2;

FIG. 10b shows an example of a playback request message sent from the client to a video server of FIG. 2.

DETAILED DESCRIPTION OF EMBODIMENTS OF THE INVENTION

Figure 1A:
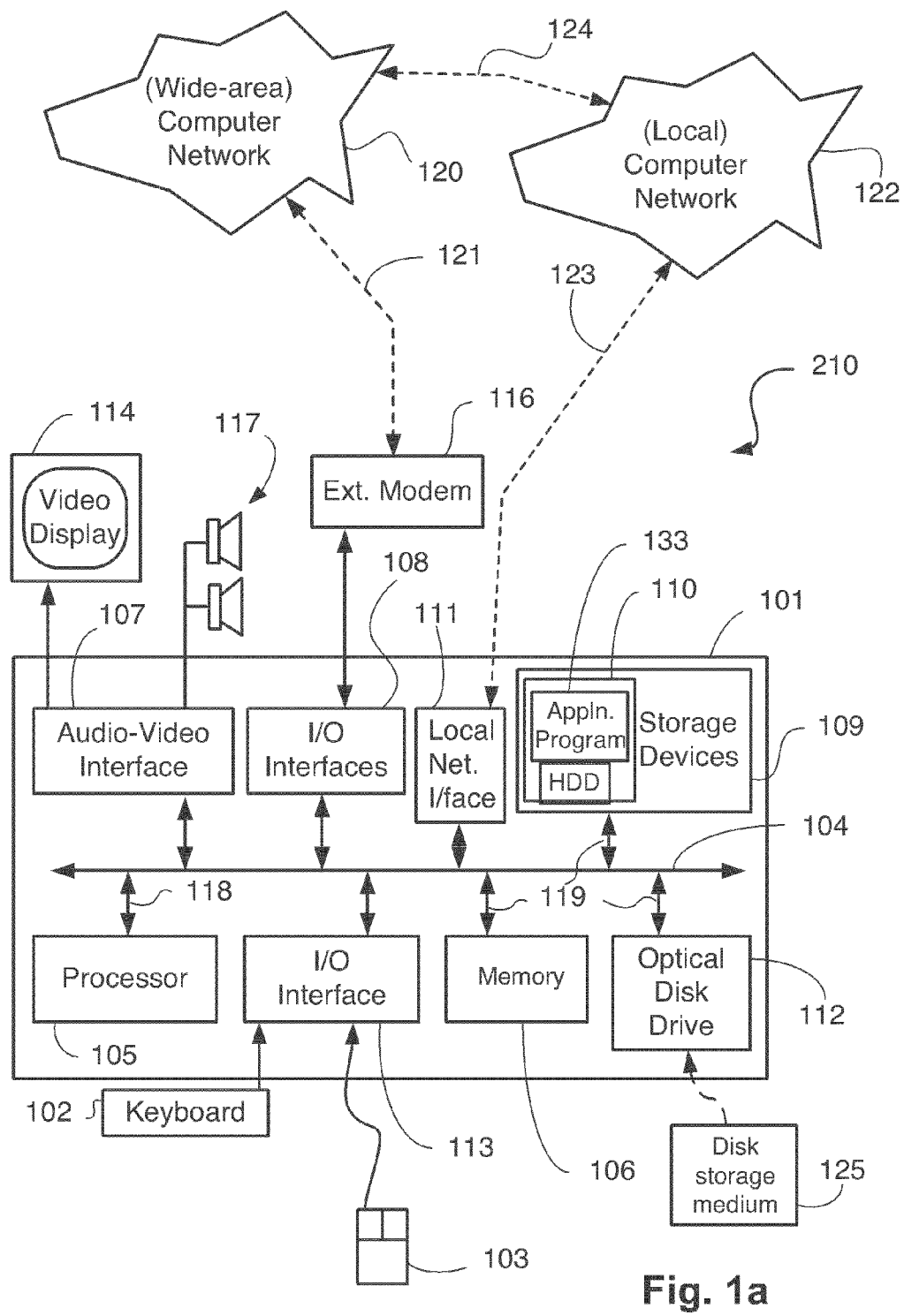
FIGS. 1a and 1b collectively form a schematic block diagram of a general purpose computing system in which the arrangements of a video server to be described may be implemented.

Where reference is made in any one or more of the accompanying drawings to steps and/or features, which have the same reference numerals, those steps and/or features have for the purposes of this description the same function(s) or operation(s), unless the contrary intention appears.

Figure 1B:
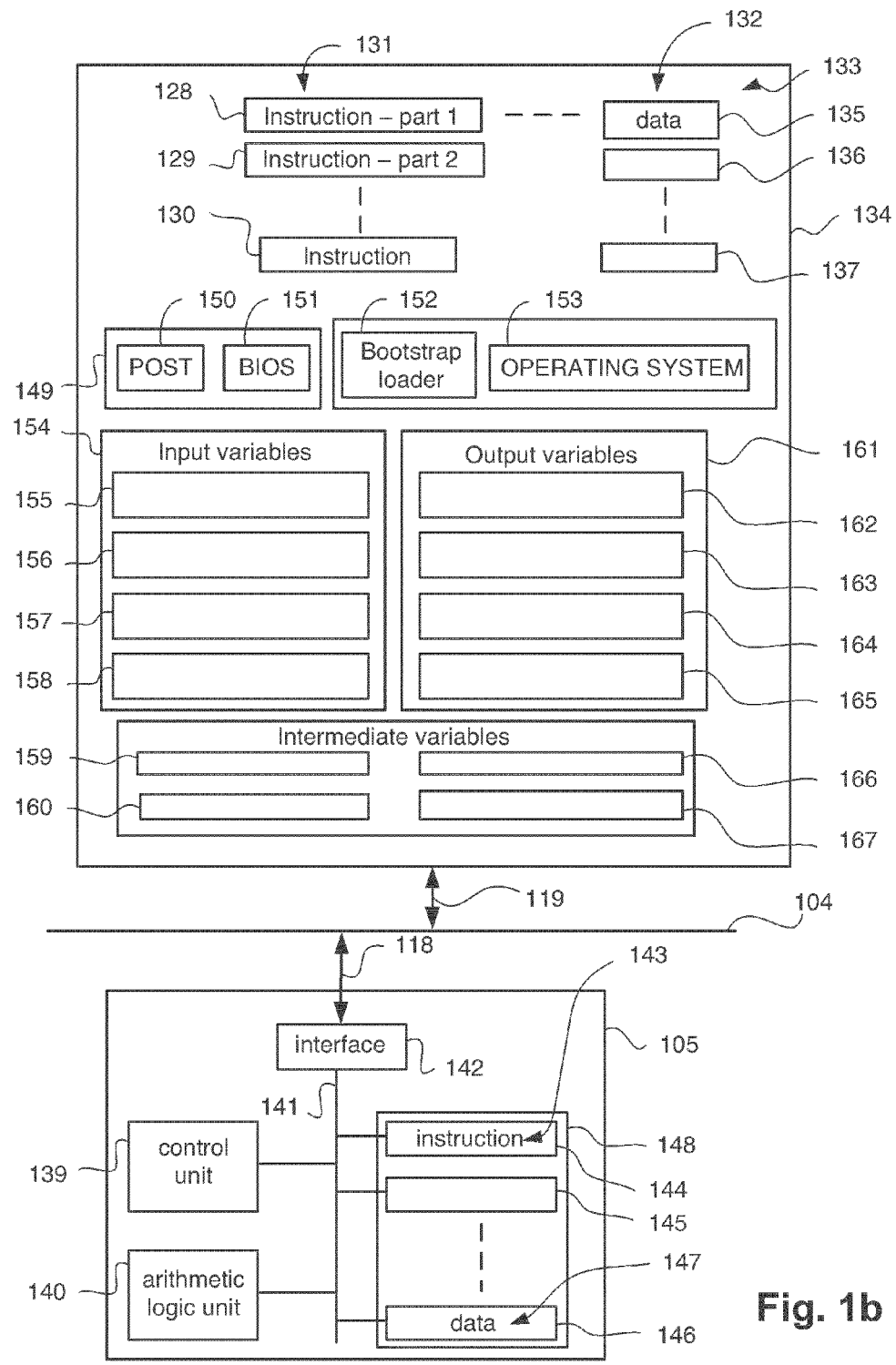
Figure 2:
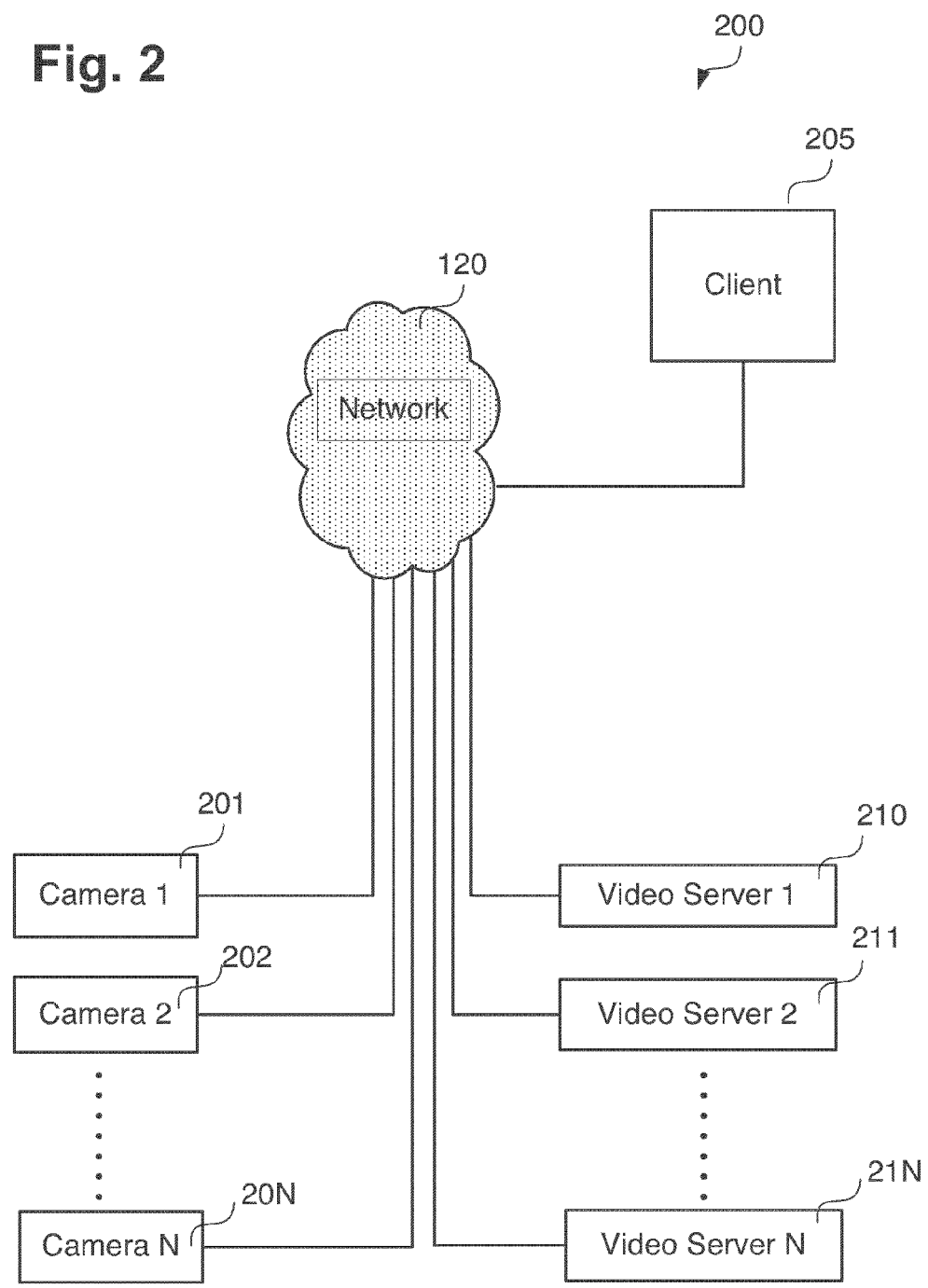
FIG. 2 is a schematic block diagram showing a digital video system upon which embodiments described herein can be practiced.

A method 700 (see FIG. 7) of matching a request for video data to a video server 210-21N seen in FIG. 2, is described below with reference to FIGS. 1 to 11b. A method 800 (see FIG. 8) of requesting video data distributed across the plurality of video servers 210-21N of the system 200 is also described below with reference to FIGS. 1 to 11b. A method 900 of transmitting video data is also described below with reference to FIGS. 1 to 11b.

In one arrangement, the methods 700, 800 and 900 may be implemented within a video system 200, such as that shown in FIG. 2. The system 200 comprises video cameras 201, 202-20N connected to a communications network 120. The network 120 may be a wide-area network (WAN), such as the Internet or a private WAN. Each of the cameras 201-20N is independently responsible for the capture of video data.

The system 200 also comprises the video servers 210, 211-21N for recording (i.e., requesting and storing) video data captured by the cameras 201-20N. The video server 210 is shown in detail in FIG. 1. The video servers 211-21N have a similar configuration to the video server 210.

As seen in FIG. 1A, the video server 201 is preferably formed by a computer module 101, input devices such as a keyboard 102, a mouse pointer device 103, and output devices including a display device 114 and loudspeakers 117.

An external Modulator-Demodulator (Modem) transceiver device 116 may be used by the computer module 101 for communicating to and from the communications network 120 via a connection 121. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes a number of input/output (I/O) interfaces including an audio-video interface 107 that couples to the video display 114 and loudspeakers 117, an I/O interface 113 for the keyboard 102, mouse 103 and an interface 108 for the external modem 116. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the video system 200.

The components 105 to 113 of the computer module 101 typically communicate via an interconnected bus 104 and in a manner which results in a conventional mode of operation of the computer module 101 known to those in the relevant art. Examples of computers on which the video server 210 can be practised include IBM-PCs and compatibles, Sun Sparcstations, Apple Mac™ or alike computer systems evolved therefrom.

Figure 11A:
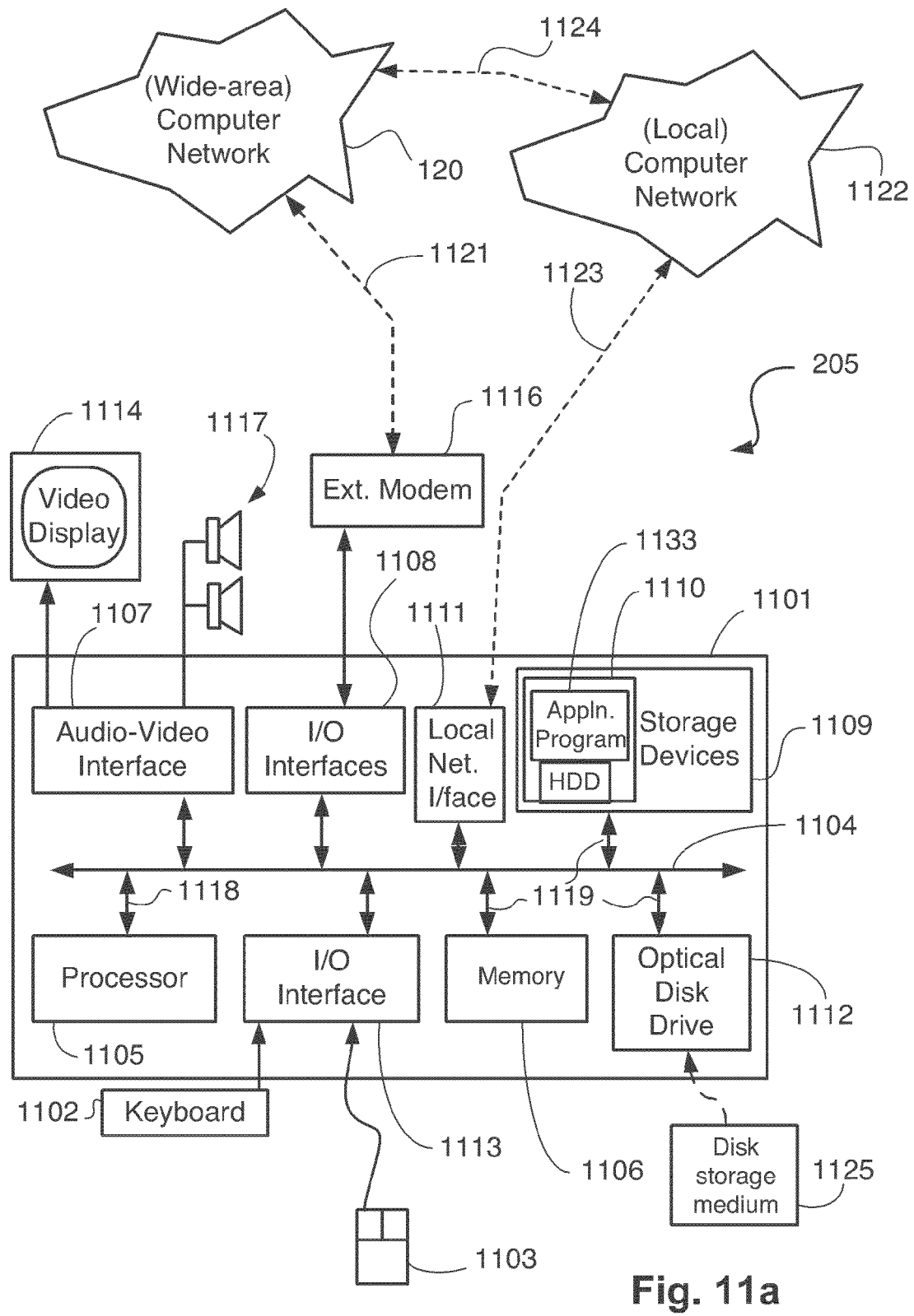
FIGS. 11a and 11b collectively form a schematic block diagram of a general purpose computing system in which the arrangements of the client of FIG. 2 may be implemented.

The video system 200 also comprises a client 205 for processing and displaying captured video data. As seen in FIG. 11a, the client 205 is preferably formed by a computer module 1101, input devices such as a keyboard 1102, a mouse pointer device 1103, and output devices including a display device 1114 and loudspeakers 1117.

An external Modulator-Demodulator (Modem) transceiver device 1116 may be used by the computer module 1101 for communicating to and from the communications network 120 via a connection 1121. Where the connection 1121 is a telephone line, the modem 1116 may be a traditional "dial-up" modem. Alternatively, where the connection 1121 is a high capacity (eg: cable) connection, the modem 1116 may be a broadband modem. A wireless modem may also be used for wireless connection to the network 1120.

The computer module 1101 typically includes at least one processor unit 1105, and a memory unit 1106 for example formed from semiconductor random access memory (RAM) and semiconductor read only memory (ROM). The module 1101 also includes a number of input/output (I/O) interfaces including an audio-video interface 1107 that couples to the video display 1114 and loudspeakers 1117, an I/O interface 1113 for the keyboard 1102, mouse 1103 and an interface 1108 for the external modem 1116. In some implementations, the modem 1116 may be incorporated within the computer module 1101, for example within the interface 1108. The computer module 1101 also has a local network interface 1111 which, via a connection 1123, permits coupling of the computer module 1101 to a local computer network 1122, known as a Local Area Network (LAN). As also illustrated, the local network 1122 may also couple to the wide network 120 via a connection 1124, which would typically include a so-called "firewall" device or device of similar functionality. The interface 1111 may be formed by an Ethernet™ circuit card, a Bluetooth™ wireless arrangement or an IEEE 802.11 wireless arrangement.

The interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (eg: CD-ROM, DVD), USB-RAM, and floppy disks for example may then be used as appropriate sources of data to the system 200.

The components 1105 to 1113 of the computer module 1101 typically communicate via an interconnected bus 1104 and in a manner which results in a conventional mode of operation of the computer system 1100 known to those in the relevant art. Examples of computers on which the client 205 can be practised include IBM-PCs and compatibles, Sun Sparcstations, Apple Mac™ or alike computer systems evolved therefrom.

The methods 700 and 900 may be implemented as one or more software application programs executable within the computer module 101. In particular, the steps of the methods 700 and 900 are effected by instructions 131 in a software application program 133 that is carried out within the computer module 101. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software application program 133 is generally loaded into the computer module 101 from a computer readable medium, and is then typically stored in the HDD 110, as illustrated in FIG. 1A, or the memory 106, after which the software 133 can be executed by the computer module 101. In some instances, the software application program 133 may be supplied to the user encoded on one or more CD-ROM 125 and read via the corresponding drive 112 prior to storage in the memory 110 or 106. Alternatively the software application program 133 may be read by the computer module 101 from the networks 120 or 122 or loaded into the computer module 101 from other computer readable media. Computer readable storage media refers to any storage medium that participates in providing instructions and/or data to the computer module 101 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the software application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer module 101 and the software application program 133 may manipulate the interface in a functionally adaptable manner to provide controlling commands and/or input to the applications associated with the GUI(s).

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 200 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The software application program 133 includes a sequence of instructions 131 that may include conditional branch and loop instructions. The software application program 133 may also include data 132 which is used in execution of the software application program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The described methods can use input variables 154 that are stored in the memory 134 in corresponding memory locations 155-158. The video retrieval arrangements produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the software application program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 7:
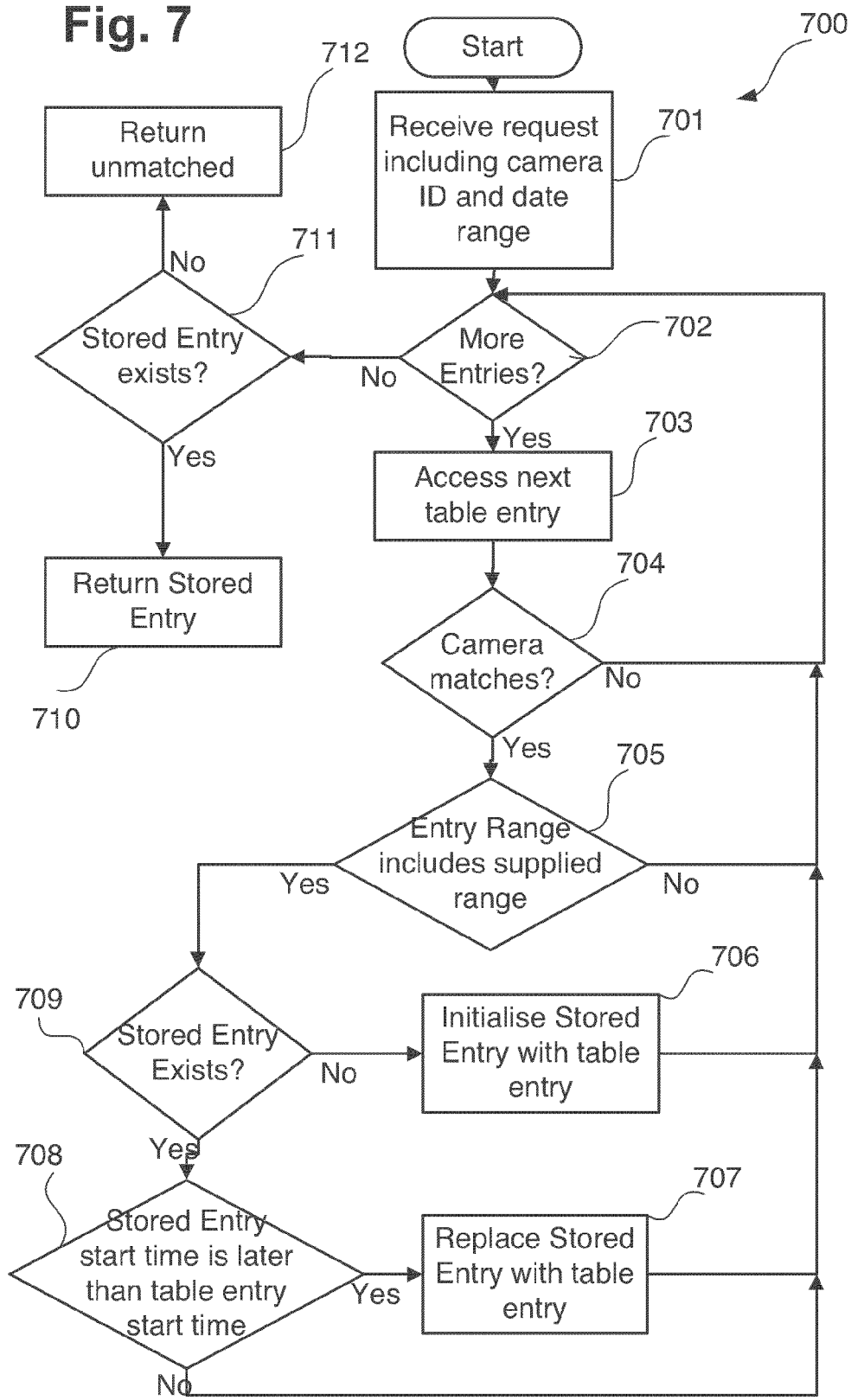
FIG. 7 is a flow diagram showing a method of matching a request for video data to a video server, using a network data record.
Figure 9:
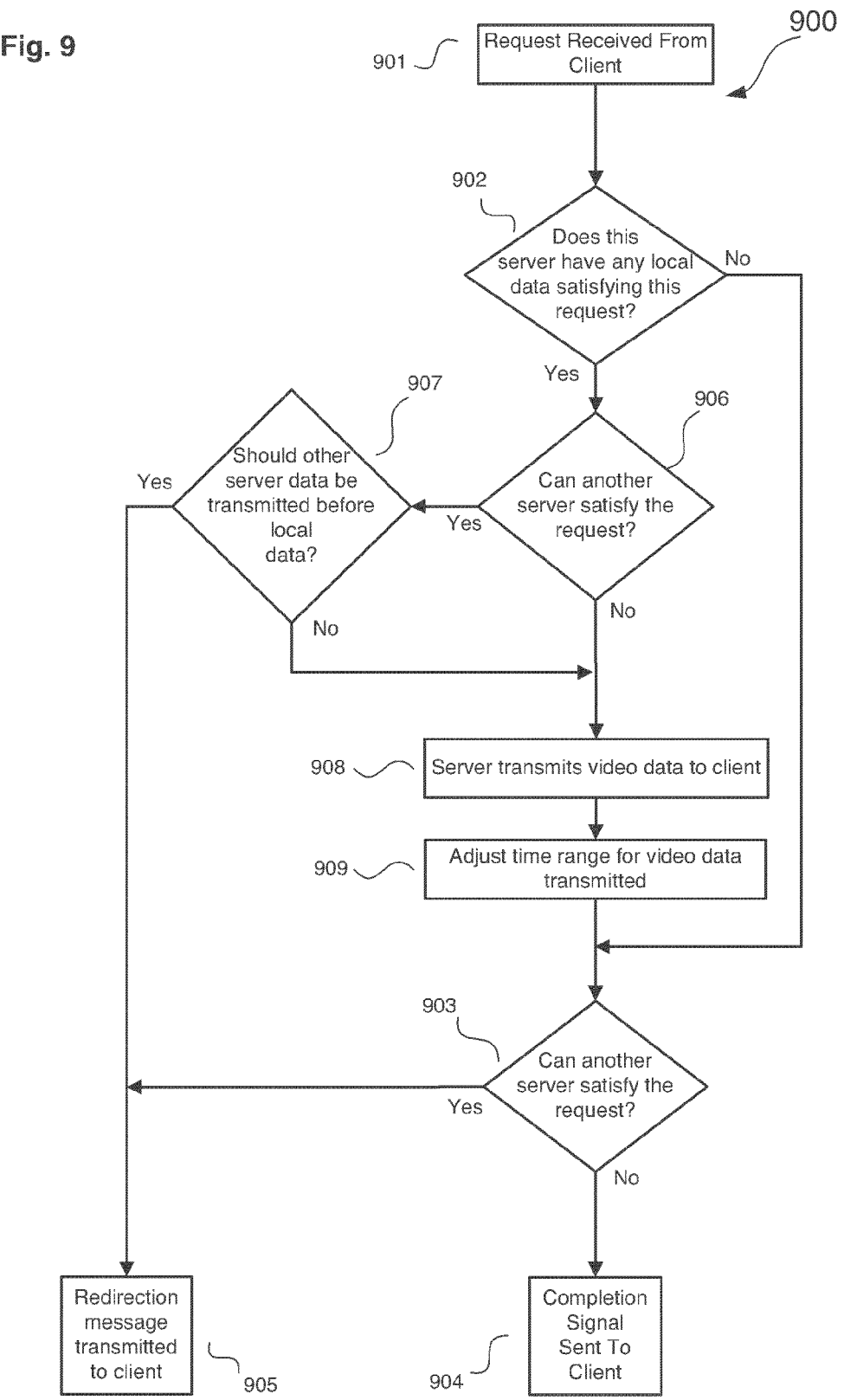
FIG. 9 is a flow diagram showing a method of transmitting video data.

Each step or sub-process in the processes of FIGS. 7 and 9 is associated with one or more segments of the software application program 133, and is performed by the register section 144-147, the ALU 140, and the control unit 139 in the processor 105 working together to perform the fetch, decode, and execute cycles for every instruction in the instruction set for the noted segments of the program 133.

The method 800 of requesting video data may be implemented as one or more software application programs executable within the computer module 1101. In particular, the steps of the method 800 are effected by instructions 1131 in a software application program 1133 that is carried out within the computer module 1101. The software instructions 1131 may be formed as one or more code modules, each for performing one or more particular tasks. The software may also be divided into two separate parts, in which a first part and the corresponding code modules performs the described methods and a second part and the corresponding code modules manage a user interface between the first part and the user.

Again, the software application program 1133 is generally loaded into the computer module 1101 from a computer readable medium, and is then typically stored in the HDD 110, as illustrated in FIG. 11A, or the memory 1106, after which the software application program 1133 can be executed by the computer module 1101. In some instances, the software application program 1133 may be supplied to the user encoded on one or more CD-ROM 1125 and read via the corresponding drive 1112 prior to storage in the memory 1110 or 1106. Alternatively the software application program 1133 may be read by the computer module 1101 from the networks 120 or 1122 or loaded into the computer module 1101 from other computer readable media. Computer readable storage media refers to any storage medium that participates in providing instructions and/or data to the computer module 1101 for execution and/or processing.

Similarly, the second part of the software application program 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer module 1101 and the software application program 1133 may manipulate the interface in a functionally adaptable manner to provide controlling commands and/or input to the applications associated with the GUI(s).

Figure 11B:
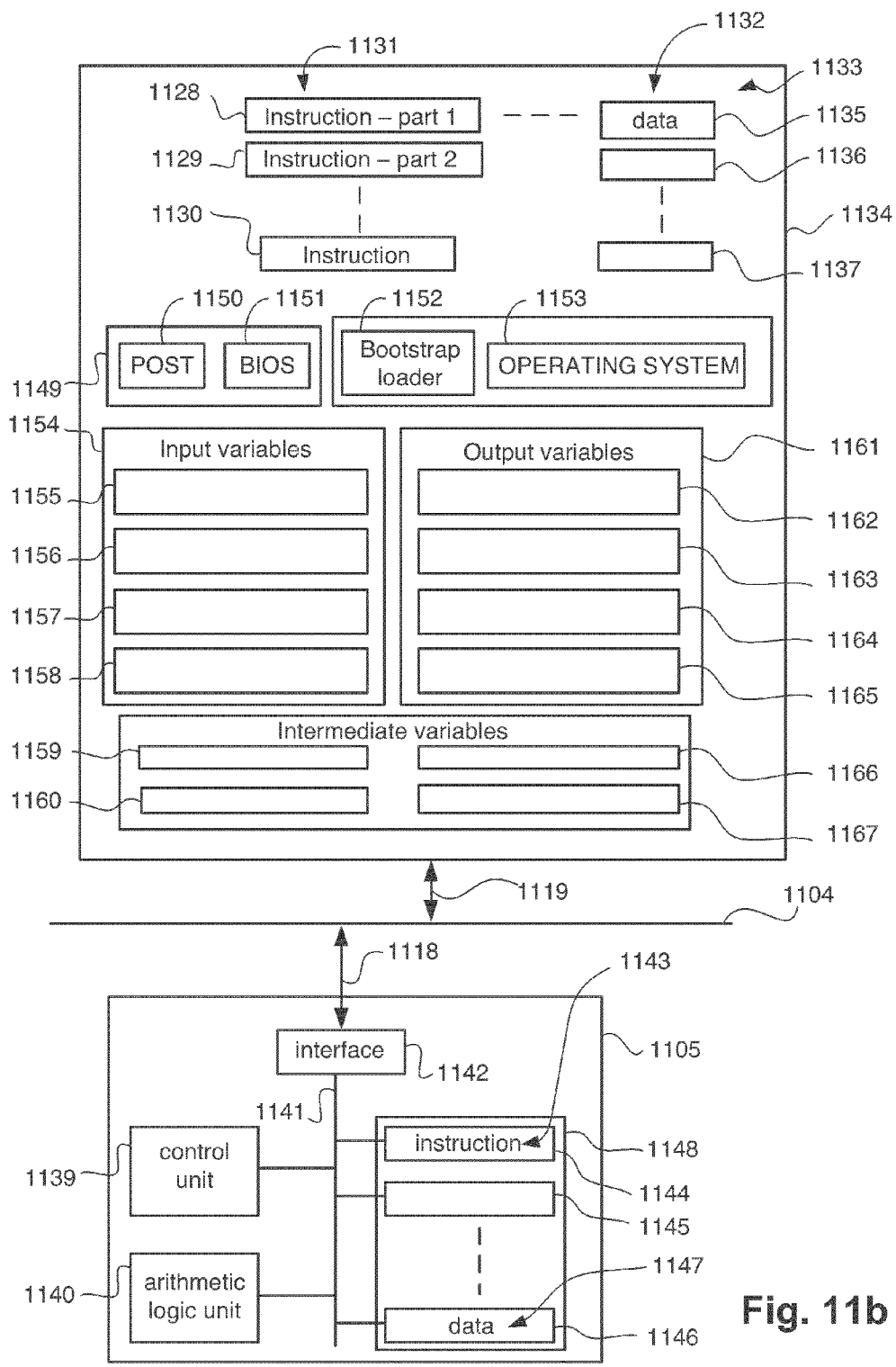

FIG. 11b is a detailed schematic block diagram of the processor 1105 and a "memory" 1134. The memory 1134 represents a logical aggregation of all the memory devices (including the HDD 1110 and semiconductor memory 1106) that can be accessed by the computer module 1101 in FIG. 11A. The processor 1105 and memory 1134 works in a similar manner to the processor 105 and memory 134 as described above with reference to FIG. 1B, and as such will not be described in detail.

The methods 700 and 900 are preferably implemented as at least part of the software application program 133 to process the video data distributed across the video servers 210-21N. In this regard, the methods 700 and 900 may execute within the computer module 101 to retrieve the video data for outputting on a display device, such as the client display device 1114.

In one embodiment, each of the video servers 210-21N are assigned an integer designation in the form of a video server identifier (ID) which is unique within the system 200. The client 205 maintains, via a local configuration file stored in the memory 1110, a mapping between a video server ID for a video server, such as the video server 210, and a host Internet Protocol (IP) name and address for that video server 201. Similarly, the cameras 201-20N are assigned an integer designation in the form of a camera ID unique to the system 200. Further, a mapping is maintained in each of the video servers 210-21N, via a local configuration file stored in the memory 110, between a camera ID for a particular camera and an IP name and address for that particular camera. In an alternative embodiment, the video server ID uses the hostname/IP to identify the video servers 210-21N and the cameras 201-20N.

The client 205 communicates directly with the video servers 210-21N across the network 120. Communications between the client 205 and the video servers 210-21N use hyper-text transport protocol (HTTP). In other embodiments, Real Time Streaming Protocol (RTSP) may be used for video data transfers between the servers 210-21N and the client 205. As described in detail below, the client 205 generates playback requests for video data which specify the camera 201-20N from which the video data originated. The requests also specify a date and time range in which the video data was captured.

Figure 3:
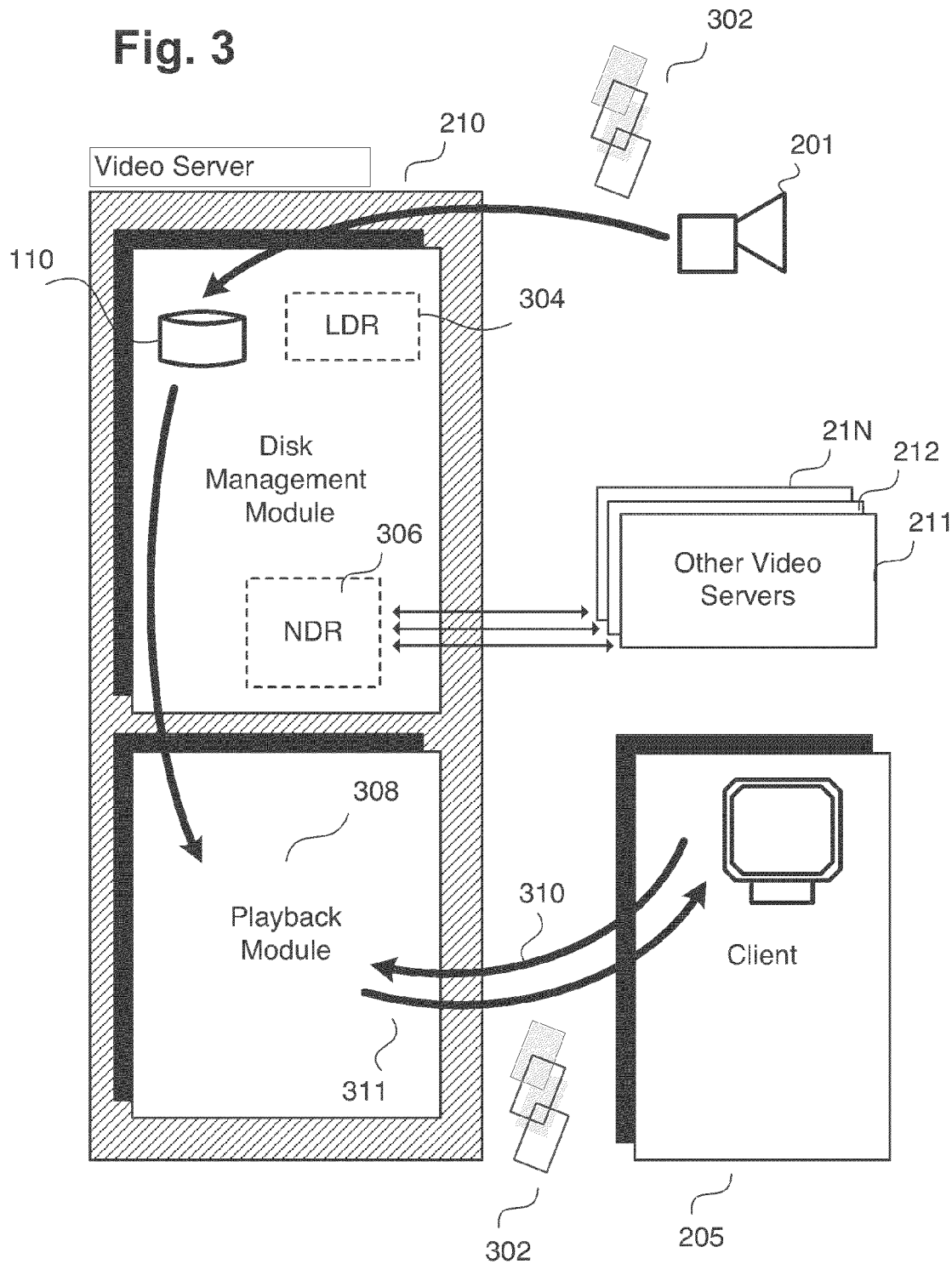
FIG. 3 is a schematic block diagram showing software modules of the video server of FIG. 2.
Figure 4A:
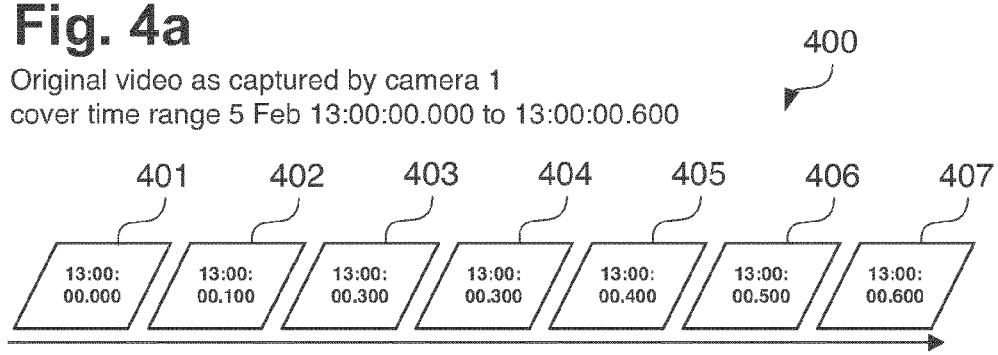
FIG. 4a shows video data frames of an original video data frame sequence according to one example.
Figure 4B:
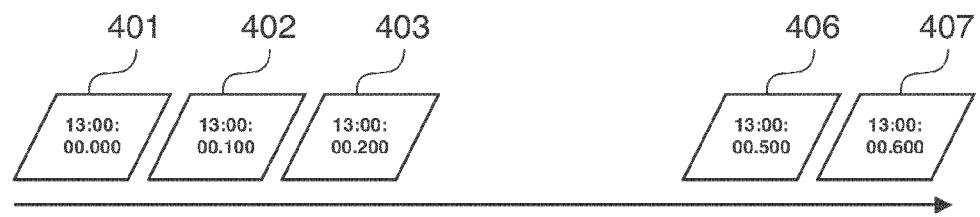
FIG. 4b shows the video data frames of FIG. 4a distributed to a first one of the video servers of FIG. 2.
Figure 4C:
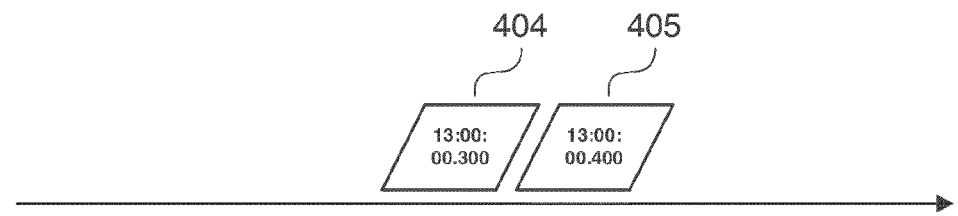
FIG. 4c shows the video data frames of the FIG. 4a distributed to a second one of the video servers of FIG. 2.

FIG. 3 shows software code modules 304, 306 and 308 of the video server 210. The software code modules 304, 306 and 308 may form part of the software application program 133 resident on the hard disk drive 110 and being controlled in their execution by the processor 105 of the video server 210. The video servers 211-21N have similar software code modules to the modules 304, 306 and 308.

According to an example seen in FIG. 3, one of the video cameras 201-20N, such as the video camera 201, supplies video data frames 302 through to disk management module 304 on the video server 210. The video server 210 stores the video data frames 302 onto the hard disk drive 110 in video data files. The video data frames 302 are stored in a digitized format (e.g., video data as defined by the motion JPEG standard, MPEG-2 standard or MPEG-4 standard). File names associated with the stored video data files include a camera ID representing the source camera 210 (i.e., Camera 1) for the video data frames 302.

The video server 210 maintains a local data record (LDR) 304 for every video (i.e., video data for a particular time period) stored on the hard disk drive 110 of the video server 210. The LDR 304 is shown in FIG. 5$b$ according to the example of FIG. 3. The LDR 304 contains the camera ID 503 for the source camera 201 (i.e., Camera 1) and a date/time range 504 covered by the video data frames in each video data file. For example, as seen in FIG. 5$b$, one video data file stored on the video server 210 stores one or more of the video data frames 302 captured by the camera 210 within the date/time range "5 Feb 2009 12:00:00.000-12:00:00.200".

Other video servers (e.g., 211-21N) connected to the network 200 exchange file update information with the video server 210, enabling each video server 210-21N to build up a record 306 of the entire video data stored in the system 200. The record 306 is referred to as a network data record (NDR). An example of an NDR 306 is shown in FIG. 5$c$.

According to the example of FIG. 3, the client 205 may make a request 310 for playback of the video data frames 302 to playback module 308 on the video server 210. In this instance, the playback module 308 accesses the requested video data frames 302 to return the video data frames 302 in reply 311.

An example stored video data frame sequence 400 is shown in FIG. 4$a$. The video data frame sequence 400 consists of seven video data frames 401 to 407 recorded from the camera 201. As the video data frames 401 to 407 were recorded from the camera 201, some of the video data frames 401-403, 406 and 407 were stored within a video data file resident on video server 210 (i.e., Video Server 1) and some of the video data frames 401 to 407 were stored in video data files stored on video server 211 (i.e., Video Server 2), as follows:

Video server 210 (i.e., Video Server 1) has video data stored in a video data file containing recorded frames 401, 402, 403, 406 and 407, as seen in FIG. 4$b$, covering two date/time ranges: 5$^{th}$ Feb 12:00:00.000 to 12:00:00.300 and 5$^{th}$ Feb 12:00:00.500 to 12:00:00.600.

Video server 211 (i.e., Video Server 2) has video data stored in a video data file containing recorded frames 404 and 405, as seen in FIG. 4$c$, covering date/time range: 5$^{th}$ Feb 12:00:00.300 to 12:00:00.400.

Each of the video Servers 210-21N are aware of the details and server location of all video data files in the system 200. The knowledge of the details and video server location of all video data files in the system 200 is built up by enabling each of the video servers 210-21N to regularly broadcast information about all video data within video files stored on the particular video server (e.g., 210) to all other video Servers 210-21N of the system 200. The information is broadcast from each of the video servers 210-21N in the form of a "file update" message.

An example of a file update message 500 is shown in FIG. 5$a$. Each file update message (e.g., 500) contains information about changes to the video data distributed across one or more of the video servers 210-21N of the system 200. In particular, the update message 500 contains an entire video data manifest of a sending video server, including date/time range 502 and source camera identification 501 of every video data file stored on the sending video server. In the example of FIG. 5$a$, the video server that transmitted the file update message 500 is storing a first video data file containing video data covering date/time range: 5$^{th}$ Feb 12:00:00.000 to 12:00:00.200 and a second video data file containing video data covering date/time range: 5$^{th}$ Feb 12:00:00.500 to 12:00:00.900.

Updates in the form of the file update message 500 are sent at regular time intervals. Updates happen regardless of whether video data files stored on a particular video server (e.g., 210) have changed (e.g., by the storing of new video data frames, or deleting of one or more of the stored video data files). Sending the updates regularly allows for the possibility of a new video server coming online (e.g., being connected to the system 200) that will need refreshing with all system information (i.e., details and video server location of all video data files stored in the system 200).

In an alternative embodiment, updates in the form of the file update message 500 may be sent after video data stored in one of the video servers 210-21N has changed. Accordingly, an update message may be sent for updating a portion of the video data distributed across one or more of the video servers 210-21N of the system 200, when that portion of video data has been changed.

In still another embodiment, the file update messages may contain information describing only changes to the video data files, where the changes have occurred in a particular period, rather than sending a complete video data file manifest every transmission. Both of these alternative embodiments may be combined with an "update me completely" message for when a new video server is connected to the system 200. For example, in response to receipt of an "update me completely" message from a particular video server 211, the video server 210 may provide an update message (e.g., 500) containing an entire data manifest of the sending video server 210, including date/time range 502 and source camera identification 501 of every video data file stored on the sending video server 210.

The video servers 210-21N use the broadcast update messages (e.g., 500) to maintain a dynamic local record of the entire video data stored in the system 200. The dynamic local record is in the form of the network data record (NDR) 306 as seen in FIG. 5$c$. Each NDR 306 contains entries describing every video data file stored on every video server 210-21N of the system 200, except for the video server (e.g., 210) actually containing the NDR 306. Each entry in the NDR 306 contains the video server ID 505 and associated camera ID 506. The NDR 306 also indicates a date/time range of the video data contained within the video data file stored on that video server 507. In the example of FIG. 5$c$, the NDR 306 indicates that the video server 210 (i.e., Video Server 1) stores video data captured by camera 201 (i.e., Camera 1) over the time range 5 Feb 2009, 12:00:00.000-12:00:00.200.

An NDR (e.g., 306) is stored in the volatile memory 106 of each video server 210-21N. The processor 105 is configured to regularly delete stale entries in the NDR 306. For example, the processor 105 may delete entries in the NDR 306 which are older than a predetermined period.

In another embodiment, the selection of a next video server for playback of video data may rely on each video server 210-21N having pre-assigned responsibilities for recording video data. For example, a particular video server (e.g., 210) may have settings in the configuration file stored on the video server 210 that establish that the video server 210 has the pre-assigned responsibility to handle all video data captured by a certain camera (e.g., 201) over a certain period of time. If the responsibilities of a video server (e.g., 210) are known by all of the other video servers 211-21N of the system 100, then the video servers 211-21N may determine the next server storing video data (if any) based on these communal responsibilities alone.

In one example as shown in FIG. 6, which builds on the example frame sequence 400 in FIG. 4, the video server 210 announces, by way of a file update message 603, the video data that is stored on the video server 210. The video server 211 similarly announces, by way of a file update message 604, the video data that is stored on the video server 211. In one embodiment, the file update messages 603 and 604 are sent as broadcasts using Transmission Control Protocol (TCP). In other embodiments, other protocols such as Windows™ Communication Foundation (WCF) may be used for transmitting the file update messages 603 and 604.

The purpose of the NDR 306 is to establish, given a request of camera ID and date range, a video server (e.g., 210) which is storing the video data that best satisfies that request.

The method 700 of matching a request for video data to a video server 210, 211-21N, using the network data record 306, will now be described with reference to FIG. 7. The matching method 700 will be described by way of example with reference to the video server 210 having the NDR stored on the video server 210. The matching method 700 may be implemented as software resident on the hard disk drive 110 of the video server 210 and being controlled in its execution by the processor 105.

The matching method 700 begins at inputting step 701, where the processor 105 of the video server 210 receives a request for video data. The request includes a desired camera ID and a desired date range. At the next step 702, if the processor 105 determines that there are entries within the NDR 306 stored in memory 110 of the video server 210 that have not been processed, then the method 700 proceeds to accessing step 703. Otherwise, the method 700 proceeds to step 711.

At accessing step 703, the processor 105 accesses a next entry of the stored NDR 306. Then at step 704, if the processor 105 determines that the camera ID received with the request does not match the camera ID of the entry, then the method returns to step 702. Otherwise, the method 700 proceeds to checking step 705.

At checking step 705, if there is no overlap between the entry date range and request data range, then the entry accessed at step 703 is ignored, and the method 700 returns to inspection step 702. Otherwise, the method 700 proceeds to decision step 709.

At decision step 709, if the processor 105 determines that there has been no previous match and no "Stored Entry" exists for the NDR entry accessed at accessing step 703, then the method proceeds to initialising step 706. Otherwise, if an earlier match has already been set as the Stored Entry, then the matching method 700 proceeds to step 708.

At initialising step 706, the NDR entry accessed at accessing step 703 is stored in the memory 106 as the Stored Entry. Following initialising step 706, the method 700 returns to inspection step 702.

At step 708, if the processor 705 determines that the date range of the NDR entry accessed at accessing step 703 covers an earlier time period than the existing Stored Entry, then the method 700 proceeds to replacing step 707. Otherwise, the method 700 returns to inspection step 702.

At replacing step 707, the processor 105 replaces the Stored Entry with the NDR entry accessed at accessing step 703 and the method 700 returns to inspection step 702.

Once the processor 105 determines at inspection step 702 that all entries of the NDR 306 have been processed then the matching method 700 proceeds to decision step 711. If the processor 105 determines at checking step 711 that there is no Stored Entry within memory 106, indicating that no matches have been found for the camera ID and date/time range request, then the matching method 700 proceeds to returning step 712. Otherwise, if the processor 105 determines that a Stored Entry does exist, then at outputting step 710 the complete Stored Entry will be returned as the best match for the requested camera and date/time range. The Stored Entry includes a video server ID indicating the video server (i.e., video server 210-21N) storing the video data matching the request.

At returning step 712, the processor 105 indicates that there are no matching entries in the NDR stored on the video server 210.

Figure 8:
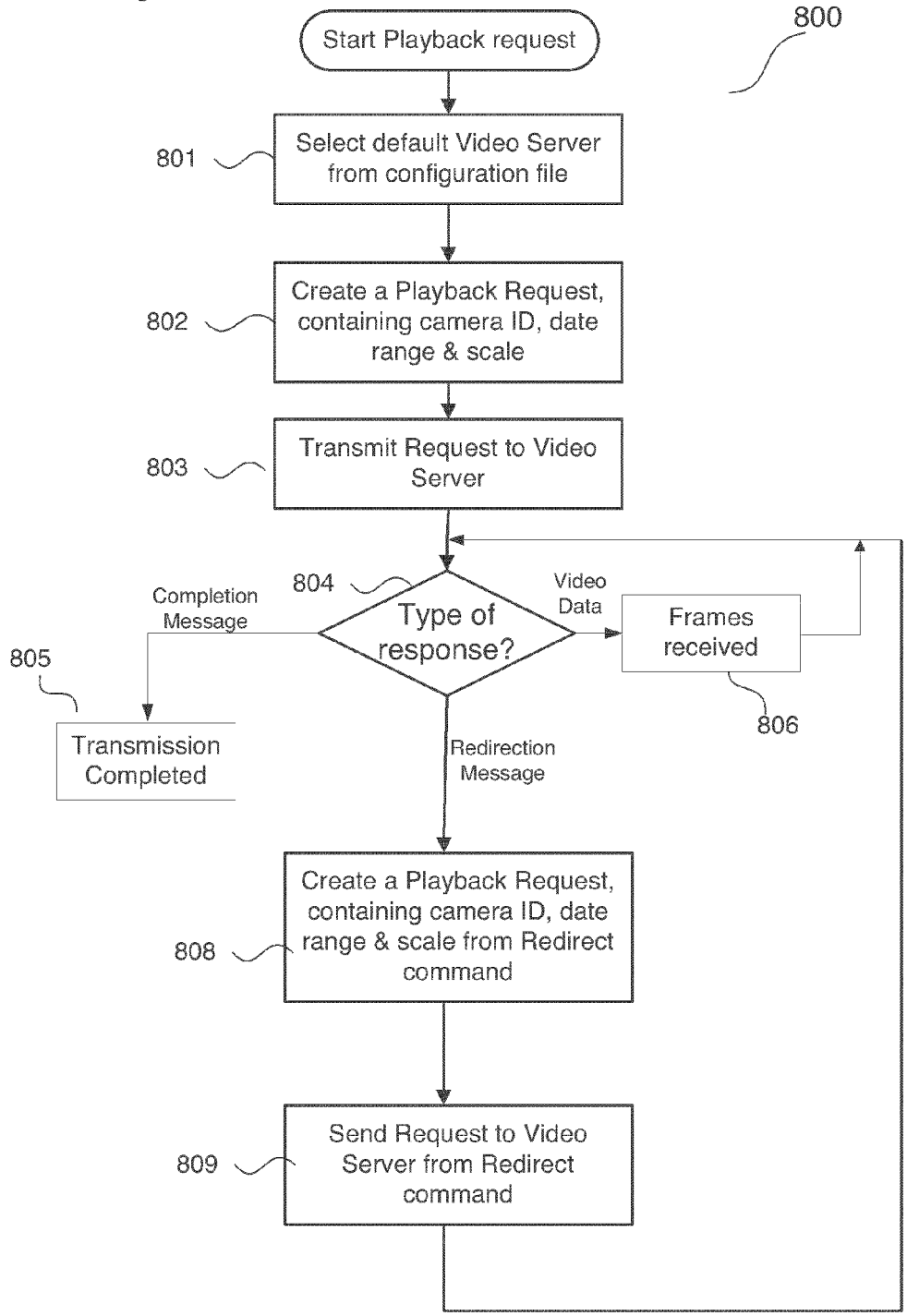
FIG. 8 is a flow diagram showing a method of requesting video data from a video server.

When the client 205 needs to initiate playback of video data, the client 205 uses the method 800 of requesting video data of FIG. 8. The method 800 may be implemented as software resident on the hard disk drive 1110 and being controlled in its execution by the processor 1105 of the client 205.

The method 800 begins in selection step 801, where an initial video server (e.g., 210) which will service the first request is selected by the processor 1105. The video server initially selected at step 801 may be any one of the video servers (e.g., 210, 211-21N) of the system 200. The video server may be selected from information in the local configuration file stored in the memory 1106 of the client 205. The selected video server may be configured as a "default" video server. In the present example, the default video server is the video server 210.

At the next step 802, the processor 1105 creates a playback request message, such as the example playback request message 1000 as seen in FIG. 10b. The playback request message 1000 comprises:

a desired source camera ID 1005;
a desired date/time range 1006 for playback: and
a scale 1007, which is a factor used for modifying playback speed & direction.

The method 800 continues at transmitting step 803, where the processor 1105 performs the step of transmitting the created playback request message 1000 to the default video server 210. As described above, the playback request message 1000 includes at least time information, in the form of the date/time range 1006, about at least a portion of the video data stored on the system 200. When the default video server 210 receives the playback request message 1000, the video server 210 executes the method 900 of transmitting video data, which will now be described in detail below with reference to FIG. 9. The method 900 may be executed as software resident on the hard disk drive 110 and being controlled in its execution by the processor 105 of the video server 210. The method 900 will be described by way of example with reference to the playback request message 1000 of FIG. 10b.

The method 900 begins at requesting step 901, where the processor 105 receives the playback request message 1000 from the client 205. As described above, the playback request message 1000 includes a desired source camera ID 1005, a desired date/time range 1006 for playback and a scale 1007.

At the next step 902, if the processor 105 determines that the video server 210 is locally storing video data files containing video data matching the camera ID 1005 and start time in the date/time range 1006 in the playback request 1000, then the method proceeds to checking step 906. Otherwise, the method 900 proceeds directly to checking step 903.

At checking step 903, the processor 105 determines, from the NDR 306 resident on the video server 210, if any of the other video servers 211-21N of the system 200 is storing video data files containing video data matching the requested camera and date/time range of the playback request message 1000. If there is no matching video data anywhere on the system 200, then the method 900 proceeds to step 904. Otherwise, if the processor 905 determines that one of the other video servers 211-21N of the system is storing video data files containing video data matching the request, then the method 900 proceeds to step 905.

At transmission step 904, the processor 105 transmits a completion signal to the client 205. However, at redirecting step 905, the video server ID 1001 (see FIG. 10a) corresponding to the video server determined at step 903 is sent within a redirection message, such as the redirection message 1008 seen in FIG. 10a, to the client 205. As seen in FIG. 10a, the redirection message 1008 includes the camera ID 1003, date range 1002 and scale 1004 included within the playback request message 1000 received at step 901.

If the processor 105 determines at decision step 902 that the video server 210 does hold locally stored video data files containing video data covering the camera ID 1005 and date/time range 1006 within the playback request message 1000, then the method 900 proceeds to step 906. At checking step 906, if the processor 105 determines, from the NDR 306 resident on the video server 210, that any of the other video servers 211-21N is storing video data files containing video data matching the requested camera ID 1005 and date/time range 1006 of the playback request message 1000, then the method 1000 proceeds to step 908. Otherwise, the method 900 proceeds to checking step 907 and the processor 105 notes the next server ID that should send video data to the client 205. This next server ID may be stored in the memory 106.

At transmitting step 908, the video data contained within the locally stored video data files matching the request 1000 is transmitted to the client 205 as one or more video data frames, in real time.

At checking step 907, the processor 105 compares the local data record (LDR) 304 with the playback request message 1000 to determine whether the video data contained within the locally stored video data files or other video data stored on the other video servers 211-21N of the system 200 (i.e., a portion of video data which is temporally adjacent to the matching video data stored on the video server 210) should be transmitted to the client 205 first. The decision is made at step 907 by comparing start times within the NDR 306 and the LDR 304. If the other video data (i.e., the temporally adjacent portion of video data) stored on the other video servers 211-21N of the system 200 should be transmitted first, then the next server ID storing that other video data is packaged into a redirection message (e.g., 1008 as seen in FIG. 10a). Accordingly, the redirection message 1008 specifies the next one of the video servers 211-21N that is storing video files containing the temporally adjacent portion of the video data. This redirection message (e.g., 1008) is transmitted to the client 205 at the next step 905. If the other video data stored on the other video servers 211-21N of the system 200 should be transmitted later than the video data contained in the video data files stored locally on the video server 210, then the method 900 proceeds to step 908.

At step 908, the video data contained in the locally stored video data files and matching the request 1000 is transmitted by the processor 105 to the client 205 as one or more video frames in real time. If there is a third piece of video data, following the other video data stored on the other video servers 211-21N of the system 200, is stored on the server 210, then the third piece of video data is not transmitted and a redirection message (e.g., 1008) is transmitted. The transmitted redirection message requests the third piece of data. For example, in FIG. 4a-4c, video frames 401, 402, and 403 which reside on, for example, server 210 are transmitted to the client 205. However, video frames 406, 407 which also reside on server 210 are not transmitted to the client 205. Such a feature allows the video server 210 to avoid transmitting unnecessary video data, if the client 205 stops playing back video data before the transmission of video frames 406, 407.

Real time in this context relates to the timing used to transmit one or more video data frames (i.e., as represented by video data) back to the client 205. In contrast to transmitting video data frames as fast as a protocol allows, real time means that video data frames are transmitted with delays between the video data frames equal to delays between the video data frames when the video data was first captured and recorded by the cameras 201-20N. Video data frames will be received by the client 205 at the same rate as the video data frames were captured and recorded. Optionally, the scale specified in the client request message (e.g., 1000) may be used to increase or decrease the delay to simulate accelerated or slowed playback of video data.

On completion of the transmission of the relevant video data in the locally stored video data files, then at adjusting step 909 the time in the date/time range 1006 from the original playback request message 1000 is adjusted to allow for the time covered by the transmitted video data (i.e., representing the one or more video data frames) contained in the locally stored video data files. Following step 909, at the next step 903, if the processor 105 determines, from the NDR 306, that the video data for the requested camera and adjusted date/time range continues on another one of the video servers 211-21N, then the method 900 proceeds to step 904. Otherwise, the method 900 proceeds to redirecting step 905. At step 904, the processor 105 transmits a completion message is to the client 205. At redirecting step 905, a redirection message 1008 is transmitted to the client 205 to notify the client 205 which video server 211-21N contains the remaining video data (i.e., a temporally adjacent portion of video data) for the requested camera and date/time range.

As described above, the redirection message 1008 of FIG. 10a contains the Server ID 1001 for the new video server 211-21N to redirect towards, the remaining date/time range 1002, the camera ID 1003, and the scale 1004. In another embodiment, the redirection message 1008 may exclude the date/time range completely, and have the client establishing the new date/time range itself by excluding from the original date/time range the date/time range of any video data frames already transmitted to the client 205.

Returning to FIG. 8, upon receiving the response from the video server 210 at determining step 804, if the processor 1105 determines that the response is a completion message, then the method 800 proceeds to step 805. Alternatively, if the processor 1105 determines that the response is a redirection message (e.g., 1008) received from the video server 210, then the method 800 proceeds to creating step 808. In still another alternative, if the processor 1105 determines that the response is the portion of the video data corresponding to the playback request message 1000, from the video server 210, then the method 800 proceeds to receiving step 806.

At step 805, the processor 1105 determines that the transfer of video data has been completed for the playback request message 1000 transmitted at step 803.

At receiving step 806, the processor 1105 stores the received video data frames in the memory 1106 of the client 205. The received video data frames may also be displayed on the display 1114. Following receiving step 806, the method 800 returns to determining step 804.

At creating step 808, the processor 1105 creates a new playback request message using the date/time range 1002, camera ID 1003 and scale 1004 received in the redirection message 1008 transmitted by the video server 210 at step 905. Then at requesting step 809, the processor 1105 sends the new playback request message (e.g., 1000) to the video server 211-21N identified in the received redirection message 1008 (i.e., the next video server 211-21N). A further portion of the video data may also be received by the next video server in response to a further redirection message.

In an alternative embodiment, the redirection message 1008 may be transmitted to the client 205 at the beginning of video frame transfer. In still another embodiment, the redirection message 1008 may be transmitted to the client 205 at a predetermined time before the video (data) frame transfer is complete. In still another alternative embodiment, the video server 210 (i.e., Video Server 1) may transmit a message to a next video server 211-21N at the time of the redirection, in order to warn the next video server of an imminent playback request from the client 205. That is, a message may be transmitted to the next video server to allow the next video server to prepare for an imminent request for video data. In still another embodiment, the redirection message (e.g., 1008) may be received by the client 205 at a pre-determined time before a temporally adjacent portion of video data is received from a next video server.

The described methods allow seamless client playback of video server hosted video data files in real time.

The methods described above may alternatively be implemented in dedicated hardware such as one or more integrated circuits performing the functions or sub functions of the described methods. Such dedicated hardware may include graphic processors, digital signal processors, or one or more microprocessors and associated memories.

Industrial Applicability

The arrangements described are applicable to the computer and data processing industries and particularly for the displaying video data.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of requesting video data, a plurality of different portions of the video data being distributed across a plurality of video servers connected to a communications network, said method comprising:
transmitting a request from a client to a first one of the video servers, each of the video servers comprising a network data record including information indicating a time range of each of the portions of video data stored on a corresponding one of the video servers, the request including information about a time range of the requested video data;
determining whether a first portion of the video data locally stored on the first video server, or whether other video data stored on the other video servers, should be transmitted to the client by comparing the time range information included in the request to start times of each of the portions of video data stored on each of the video servers; and
transmitting, from the first video server to the client, the first portion of video data and a redirection message, the redirection message comprising information about a next one of the video servers containing a further portion of the video data, the further portion of video data being temporally adjacent to the first portion of video data, the redirection message further comprising a remaining time range of the temporally adjacent further portion of video data, the remaining time range being generated by adjusting the time range information included in the request.

2. The method according to claim 1, wherein each of the video servers has a pre-assigned responsibility.

3. The method according to claim 1, wherein an update message for updating a portion of the video data is transmitted when the video data has been changed.

4. The method according to claim 3, wherein said update message contains information about changes to the video data.

5. The method according to claim 1, further comprising establishing a range of the temporally adjacent portion of video data to be received based on the redirection message.

6. The method according to claim 1, wherein the redirection message is received at a pre-determined time before the temporally adjacent portion of video data is received from the next video server.

7. The method according to claim 1, further comprising transmitting a message to the next video server to allow the next video server to prepare for an imminent request for video data.

8. The method according to claim 1, further comprising receiving the temporally adjacent portion of video data.

9. The method according to claim 8, further comprising receiving a further portion of the video data after said temporally adjacent portion of video data, in response to a further redirection message from the next video server.

10. A system for requesting video data, said system comprising:
a plurality of video servers connected to a communications network, a plurality of different portions of the video data being distributed across the video servers;
a client coupled to the video servers, via the communications network, the client comprising a processor for executing a computer program, said computer program comprising instructions that, when executed, cause the system to:
transmit a request from the client to a first one of the video servers, each of the video servers comprising a network data record including information indicating a time range of each of the portions of video data stored on a corresponding one of the video servers, the request including information about a time range of the requested video data;
determine whether a first portion of the video data locally stored on the first video server, or whether other video data stored on the other video servers, should be transmitted to the client by comparing the time range information included in the request to start times of each of the portions of video data stored on each of the video servers; and transmit, from the first video server to the client, the first portion of video data and a redirection message, the redirection message comprising information about a next one of the video servers containing a further portion of the video data, the further portion of video data being temporally adjacent to the first portion of video data, the redirection message further comprising a remaining time range of the temporally adjacent further portion of video data, the remaining time range being generated by adjusting the time range information included in the request.

* * * * *